(12) United States Patent
Wilson et al.

(10) Patent No.: US 7,762,684 B2
(45) Date of Patent: Jul. 27, 2010

(54) HAND-HELD STABILIZED LASER POINTER

(76) Inventors: Jeffrey Dale Wilson, 5447 Palace Ct., Goleta, CA (US) 93111; Daniel Steven Sanchez, 1140 Via Regina, Santa Barbara, CA (US) 93111

( * ) Notice: Subject to any disclaimer, the term of this patent is extended or adjusted under 35 U.S.C. 154(b) by 214 days.

(21) Appl. No.: 11/649,668

(22) Filed: Jan. 3, 2007

(65) Prior Publication Data
US 2007/0109783 A1    May 17, 2007

Related U.S. Application Data

(63) Continuation-in-part of application No. 10/735,020, filed on Dec. 12, 2003, now abandoned.

(51) Int. Cl.
*G02B 27/20* (2006.01)
*F21V 19/00* (2006.01)
*F21V 15/04* (2006.01)

(52) U.S. Cl. .................. 362/259; 362/288; 362/369

(58) Field of Classification Search ................ 362/259, 362/369, 390, 274, 288; 356/148, 149
See application file for complete search history.

(56) References Cited

U.S. PATENT DOCUMENTS

| | | | |
|---|---|---|---|
| 4,357,649 A | | 11/1982 | LaCroix |
| 5,122,908 A | * | 6/1992 | Sporer ......................... 359/557 |
| 5,144,487 A | * | 9/1992 | Hersey ........................ 359/629 |
| 5,272,814 A | * | 12/1993 | Key ............................. 33/290 |
| 5,459,932 A | * | 10/1995 | Rando et al. .................. 33/291 |
| 5,552,886 A | * | 9/1996 | Kitajima et al. .............. 356/250 |
| 5,724,744 A | * | 3/1998 | Bozzo .......................... 33/291 |
| 6,035,540 A | | 3/2000 | Wu et al. |
| 6,792,685 B1 | | 9/2004 | Ng et al. |
| 7,553,048 B2 | * | 6/2009 | Wilson et al. ................ 362/297 |

\* cited by examiner

*Primary Examiner*—Alan Cariaso

(57) ABSTRACT

A hand-held laser pointer is disclosed that comprises a laser module that is isolated from unwanted hand tremor motions of the laser pointer housing. A passive inertial stabilizer is utilized for stabilizing the laser module to suppress laser dot jitter associated with hand tremor. To achieve the above object, a collimated laser diode module is mounted on a stage that is suspended by a low-friction gimbal that pivots with respect to the housing of the pointer on two intersecting and mutually perpendicular axes. The inertial stage is coupled to the housing via a spring and damper.

4 Claims, 2 Drawing Sheets

HAND-HELD STABILIZED LASER POINTER

CROSS REFERENCE TO RELATED APPLICATIONS

This is a continuation-in-part of application Ser. No. 10/735,020; filed Dec. 12, 2003 now abandoned.

BACKGROUND OF THE INVENTION

1. Field of the Invention

The present invention relates to laser pointers. More particularly, the present invention relates to hand-held laser pointers. Even more particularly, the present invention relates to a hand-held laser pointer stabilized against hand tremor.

2. Prior Art

Various hand-held laser pointers have been taught for visually pointing out a target on, for example, a whiteboard, chart, map, or projected display. Laser pointers typically include a laser diode module that produces a collimated laser beam. The laser diode module is packaged within a housing and is battery powered. A user holds the pointer in one hand and directs the laser beam towards a target, generally during a presentation or the like.

The effectiveness of such hand-held laser pointers for particularly pointing out a target is reduced by the unintentional tremor of the user's hand. Human tremor is an involuntary trembling or shaking of the muscles of the body associated with physical weakness, emotional stress, or excitement. The small angular movements of the hand from tremor impart undesirable motion to the laser pointer and its corresponding laser beam and image, which is generally a small dot indicating where the beam is striking the target. This unwanted motion is amplified as the distance between the laser diode and the target increases and generally results in visibly shaky movements of the laser dot. The jitter of the laser dot limits the user's pointing resolution which may distract an audience, expose nervousness and may act to discredit the user.

To address this problem, some hand-held laser pointer devices have been taught that blink on and off, or create a pulsed laser beam. These devices mask the problem and do not stabilize the orientation of the laser light beam. Uninterrupted siting of the laser dot is additionally not achieved by this type of laser pointer.

Other suggested means for coping with hand tremor while pointing a hand-held laser pointer include turning the laser on only momentarily, holding the pointer with both hands to reduce tremor, resting the pointing hand, wrist, or arm on a stable object, or connecting the pointing device directly to a stable object such as a podium. The lack of an adequate solution to this problem has prompted many to suggest that hand-held laser pointers should not be used during presentations.

Artisans have made attempts to provide a laser pointer wherein the pointer is protected from damage when subjected to high frequency vibration and shock. For example, LaCroix, in U.S. Pat. No. 4,357,649, disclosed a laser pointer wherein the laser is protected from shock by supporting it with a cushion material at each end within its housing. It can be shown mathematically that the construction disclosed by LaCroix is inoperable for isolating the laser from low-frequency tremor as occurs when hand-held. The required natural frequency of the suspended laser must be significantly lower than the frequency of hand tremor. Hand tremor is small in magnitude and slow in frequency, less than 0.1 degree at 4 Hz frequency. A cushion means to support the laser transmits the majority of the unwanted low frequency hand tremor motions of the housing to the laser.

Artisans have disclosed laser devices that point in a direction relative to the direction of gravity irrespective of the housing orientation. WU, in U.S. Pat. No. 6,035,540, teaches an industrial laser level using a hanging mechanism. The invention of WU requires that the pivot for the laser be significantly offset from the center of mass of the counter-weighted pivoting assembly in order that the laser always points in the direction of gravity. The invention of WU continues pointing in a direction relative to the direction of gravity when the housing is tilted. NG, in U.S. Pat. No. 6,792,685, teaches a damped bearing assembly for a laser plumb that includes a spinning mass affixed to the pivoting laser assembly. Similar to WU, NG's invention only points in a direction relative to the direction of the gravity and is structurally designed for that purpose. The inventions taught by WU and NG are not sufficient to enable a laser to be both arbitrarily aimed in an arbitrary desired direction by pointing the housing while at the same time attenuating motions due to hand tremor.

There is a need in the art for an improved hand-held laser pointer that substantially eliminates the effect of hand tremor on the direction of the laser beam produced by a hand-held laser pointer.

SUMMARY

It is a primary object of the present invention to provide a hand-held laser pointer that suppresses or minimizes laser dot jitter associated with hand tremor.

To meet the above object of the invention, a hand-held laser pointer is disclosed that generally comprises:

(a) a housing having an interior chamber and a longitudinal axis;
(b) a power source disposed within the interior chamber of the housing; and
(c) a laser module disposed within the interior chamber of the housing, the laser module being in electrical communication with the power source and operable for producing a laser beam, wherein the laser module is passively inertially stabilized with respect to motion of the housing about at least one axis perpendicular to the longitudinal axis of the housing.

In a preferred embodiment of a hand-held laser pointer operable for providing a laser beam having a direction defining a longitudinal axis, the laser pointer comprises: (a) a housing; (b) a laser module enclosed within the housing; (c) a power supply enclosed within the housing and in electrical communication with the laser module; (d) a counterweight rigidly attached to the laser module by a bridge, the laser module, counterweight and bridge collectively forming an inertial mass having a center of gravity disposed on the bridge; (e) a gimbal affixed to said housing and said bridge at the center of gravity of said inertial mass, said gimbal pivoting on two intersecting and mutually perpendicular axes; and (f) means for biasing said gimbal-mounted inertial mass to a neutral position with respect to said housing, said biasing means being operable for damping angular vibration between said inertial mass and said housing while enabling said laser pointer to be panned. The counterweight is preferably adjustable towards and away from said mutually perpendicular pivot axes of said gimbal. The means for biasing the inertial mass to a neutral position preferably employs a magnetic field interaction between a magnetic or ferromagnetic first material disposed on the inertial mass, and a ferromagnetic or magnetic second material affixed to said housing. An electrically conductive non-magnetic material may be disposed on the inertial mass in proximity to a second magnetic material affixed to the housing. The magnetic interaction therebetween provides a damping effect by the generation of eddy currents therein. Preferably, the magnetic material is movably mounted to the housing and adjustable towards and away from the conductive non-magnetic material disposed on the inertial mass.

The laser assembly is mounted to a pitch and yaw inertially stabilized frame disposed within the housing that provides for pivoting of the laser assembly with respect to the housing about two axes that are orthogonal to the longitudinal axis and to each other. The inertial stabilization is accomplished passively. The laser assembly serves as an inertial mass that is balanced to be substantially free from gravitational influence while gimballed to the housing. The inertial mass is spring biased to a neutral position with respect to the housing. A damping element may be positioned interior the housing and is provided to improve stabilization.

Low frequency angular movements of the housing are transmitted to the laser assembly while angular movements of the housing substantially at or above a predetermined frequency and, preferably, in a range similar to the frequencies associated with hand tremor, are isolated from the laser assembly.

The features of the invention believed to be novel are set forth with particularity in the appended claims. However the invention itself, both as to organization and method of operation, together with further objects and advantages thereof may be best understood by reference to the following description taken in conjunction with the accompanying drawings.

DESCRIPTION OF THE PREFERRED EMBODIMENTS

Figure 1:
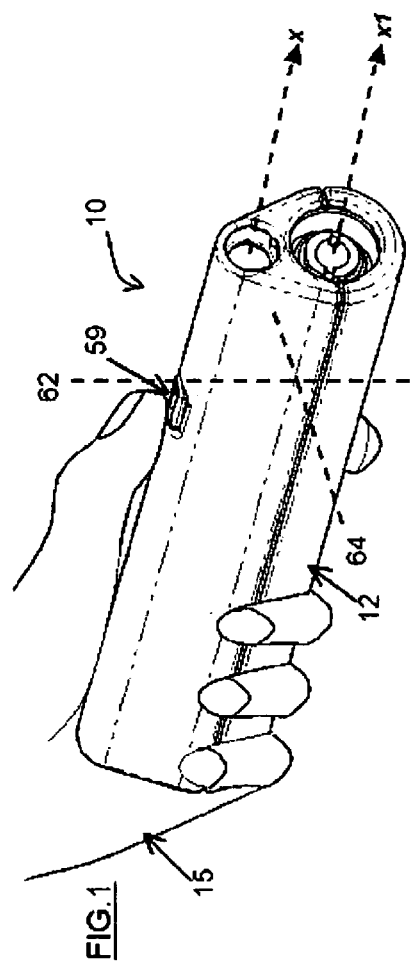
FIG. 1 is a perspective view of a tremor-stabilized, hand-held laser pointer in accordance with the present invention.
Figure 2:
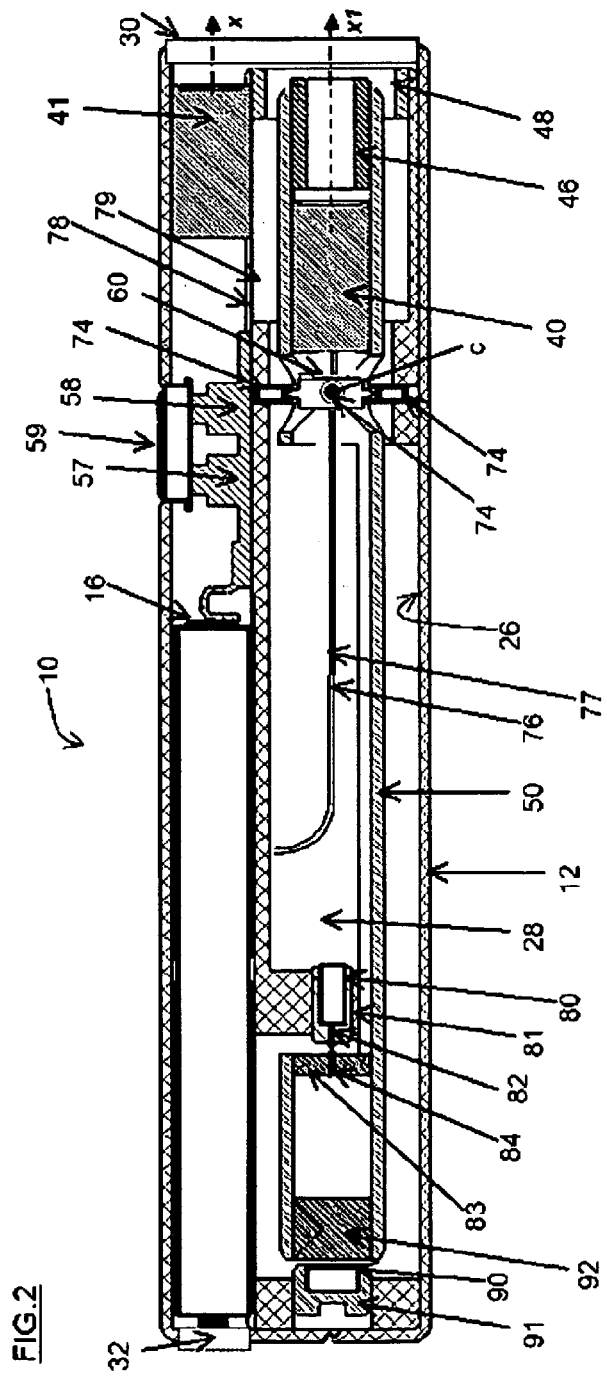
FIG. 2 is a side plan view of the laser pointer of FIG. 1.
Figure 3:
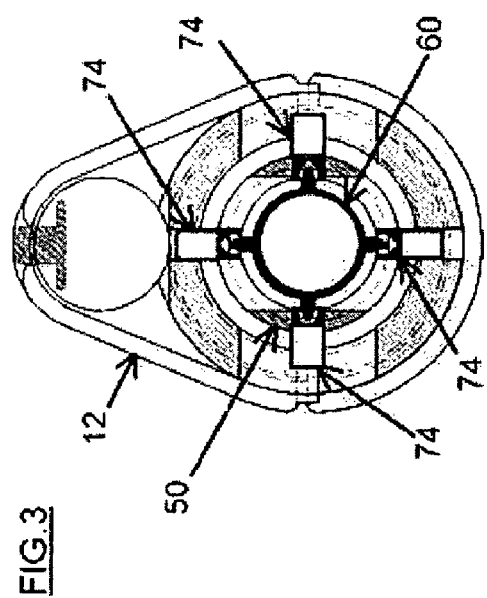
FIG. 3 is a schematic view of a gimbal included in a laser pointer according to the present invention.
Figure 4:
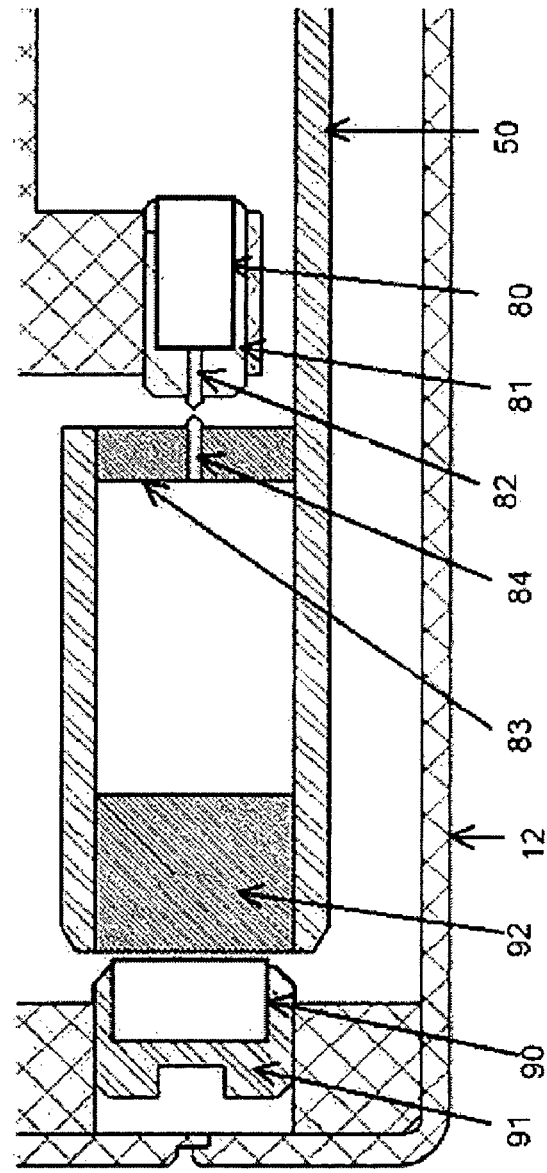
FIG. 4 is a magnified view of the spring and damping means included in a laser pointer according to the present invention.

Referring to FIGS. 1 and 2, the preferred embodiment of a hand-held laser pointer in accordance with the present invention is shown at 10. The laser pointer 10 generally includes a housing 12, a laser assembly 14, and a power source 16. The housing 12 has a inner surface 26. The housing 12 defines an open interior 28.

A transparent material 30 such as clear plastic, glass, or some well known optically transparent material separates the interior of the housing 12 from the external environment. The housing 12 includes a power supply access 32 for facilitating the mounting and dismounting of the power source 16. The power source 16 is preferably a single battery or a plurality of batteries.

The laser assembly 40 and laser assembly 41 each include a collimating lens, a laser element, and a driving circuit. The output of the laser element is preferably a laser diode that emits coherent light of a desired color such as red, green, blue, or infrared laser light. Suitable laser elements are produced by Nichia Corporation having a principle place of business at 491 Oka, Kaminaka-Cho, Anan-Shi, Tokushima 774-8601, Japan and by Cree, Inc., having a place of business at 4600 Silicon Drive, Durham, N.C. 27703.

The laser assembly 40 and a counterweight 46 is mounted to a bridging element 50. The weighted element 46 defines or comprises a counterweight so that the laser assembly 40 is balanced about a centerpoint C of the bridging element 50. The bridging element 50 is suspended in the housing 12 by a low friction gimbal 60 that pivots about substantially perpendicular first and second axes 62, 64 each of which is perpendicular to longitudinal axis x1. The gimbal 60 is pivotally mounted to the housing 12. Such pivotal mounting may be accomplished via pairs of pin and cup mechanisms 74 or other low friction bearing elements.

The laser module assembly 40, the counterweight 46, and the bridging element 50 act as a pivoting inertial mass suspended by the gimbal 60. The laser module housing 40, the counterweight 46, and the bridging element 50 may be formed from synthetic resinous materials or metallic materials. A soft cylindrical component 48 is used to limit the allowable travel of the inertial mass. Moving 48 towards or away from the gimbal center C respectively increases or decreases the range of travel of the inertial mass.

In a preferred embodiment of the stabilized laser pointer 10, a threaded shaft 81 mounted to the housing 12 contains a magnet 80 and a ferromagnetic pin 82. The magnetic field from magnet 80 is focused though the ferromagnetic pin 82. A ferromagnetic pin 84 is mounted within a conductive non-magnetic material 83 mounted to the bridging element 50. The magnetic field of magnet 80 is focused through pin 82 to interact with the ferromagnetic material 84 to provide a small magnetic spring coupling between the pivoting inertial mass and the housing 12. The assembly comprising threaded element 81, pin 82, and magnet 80 can be adjusted towards or away from pin 84 to increase or decrease the magnetic restoring force.

A conductive non-magnetic material 92 is mounted on bridging element 50. A threaded shaft 91 contains a magnet 90 and serves to dampen the magnetic spring coupling between the pivoting inertial mass and the housing 12 by interaction with component 92. The assembly comprising threaded element 91 and magnet 90 can be adjusted towards or away from conductive non-magnetic material 92 to respectively increase or increase the magnitude of the damping.

Essential tremor and postural tremor frequencies are generally between 4 Hz and 12 Hz. As such, the spring (magnetic coupling) and damping characteristics are sized for effective isolation of angular motion imparted to the laser assembly 14 about axes 62, 64 within this frequency range, while providing adequate angular motion coupling about axes 62, 64 for effective panning and tilting of the laser assembly 14 during use. Various arrangements of these or other spring and damping materials may be employed to provide alternate or adjustable spring and damping characteristics.

With reference now to FIG. 2, the laser assembly 40 is electronically connected to the power source 16 via two electrical paths 76 and 77. At least one of these paths is electronically connected to a switch 58 on the housing 12. Power is supplied to the laser assembly 14 by actuating the switch 58. Electrical connections between the power source 16, the switch 58, and the laser assembly 14 may be comprised of flexible wiring. A second laser assembly 41 is directly mounted within the housing 12 and is electronically connected to the power source via electrical paths 78 and 79. At least on of the paths is electronically connected to a switch 57. A switch cover 59 protrudes through housing 12 and is direct contact with switches 57 and 58. Switch cover 59 can be pressed to activate both switch 57 and switch 58 at the same time or pressed to activate only one of the switches at a time.

When the user grasps the laser pointer 10 with his/her hand and switches on the switch 58, the laser beam is emitted from the laser assembly 40 through the aperture 30 of the housing 12 towards a target. Low frequency angular movements of the housing will be transmitted to the laser assembly 40 and its emitted laser beam while angular movements of the housing 12 substantially at or above a predetermined frequency and, preferably, in a range similar to the frequencies associated with hand tremor, will be isolated from the laser assembly 14 and its emitted laser beam. The preferred embodiment of the present invention passively accomplishes stabilization of hand tremor that may be imparted to the laser pointer 10. A power source is not required for stabilization and it is more cost effective to stabilize the laser assembly 14 in a passive fashion in accordance with the present invention. When the user activates switch 57, a laser beam is emitted from the laser assembly 41 towards a target, said laser beam not stabilized from hand tremor.

While particular embodiments of the present invention have been illustrated and described, it would be obvious to those skilled in the art that various other changes and modifications can be made without departing from the spirit and scope of the invention. For example, the laser pointer may further include an elastically deformable material disposed within the interior 28 between the counterweight 46 and the inner surface 26 of the housing 12. In addition, the laser pointer may be mounted on a transportable device, as, for example, on a vehicle, and still enjoy the advantages of the stabilization system. It is therefore intended to cover in the appended claims all such changes and modifications that are within the scope of this invention.

What we claim is:

1. A hand-held laser pointer comprising: (a) a housing adapted to be held by a hand, said housing having an axis; (b) a laser operable for producing a laser beam, said laser supported by said housing; (c) a structure allowing angular motion of said laser beam with respect to said housing; (d) means applied to said structure for biasing the orientation of said laser beam to be substantially parallel to said axis of said housing; and (e) damping means applied to said structure operable for stabilizing said orientation of said laser beam with respect to angular motion of said housing about at least one additional axis perpendicular to said axis of said housing when said angular motion of said housing is due to hand tremor; said laser pointer operable for pointing said laser beam in a desired arbitrary direction by pointing said housing.

2. A hand-held laser pointer comprising: (a) a housing adapted to be held by a hand, said housing having an axis; (b) a laser operable for producing a laser beam, said laser supported by said housing; (c) a structure allowing angular motion of said laser beam with respect to said housing; (d) means applied to said structure for biasing the orientation of said laser beam to be substantially parallel to said axis of said housing; and (e) passive damping means applied to said structure operable for stabilizing said orientation of said laser beam with respect to angular motion of said housing about at least one additional axis perpendicular to said axis of said housing when said angular motion of said housing is due to hand tremor; said laser pointer operable for pointing said laser beam in a desired arbitrary direction by pointing said housing.

3. A hand-held laser pointer with an axis operable for pointing a laser beam in a desired arbitrary direction by pointing said laser pointer, said laser pointer comprising: (a) a housing; (b) a laser operable for producing said laser beam; (c) a counterweight rigidly attached to said laser by a bridge, said laser, counterweight and bridge collectively forming an inertial mass having a center of gravity; (d) a low friction pivot means affixed to said housing and said inertial mass, said pivot means operable for pivoting said inertial mass substantially on two mutually perpendicular axes, said perpendicular axes being perpendicular to said axis of said housing and intersecting at said center of gravity of said inertial mass; and (e) means for biasing the orientation of said inertial mass to be substantially parallel to said axis of said housing; said biasing means being operable for damping angular motion about said two mutually perpendicular axes, when said angular motion is due to hand tremor.

4. A hand-held laser pointer with an axis operable for pointing a laser beam in a desired arbitrary direction by pointing said laser pointer, said laser pointer comprising: (a) a housing; (b) a laser operable for producing said laser beam; (c) a counterweight rigidly attached to said laser by a bridge, said laser, counterweight and bridge collectively forming an inertial mass having a center of gravity; (d) a low friction pivot means affixed to said housing and said inertial mass, said pivot means operable for pivoting said inertial mass substantially on two mutually perpendicular axes, said perpendicular axes being perpendicular to said axis of said housing and intersecting at said center of gravity of said inertial mass; (e) means for biasing the orientation of said inertial mass to a neutral position with respect to said housing, said biasing means being operable for damping angular motion about said two mutually perpendicular axes, when said angular motion is due to hand tremor, said biasing of said inertial mass to a neutral position employs a magnetic field interaction between a magnetic or ferromagnetic first material disposed on the inertial mass and a ferromagnetic or magnetic second material affixed to said housing.

* * * * *